US009131254B2

United States Patent
Jiang et al.

(10) Patent No.: US 9,131,254 B2
(45) Date of Patent: Sep. 8, 2015

(54) CROSS LAYER CODING FOR SATELLITE MOBILE TV BROADCAST METHOD AND APPARATUS

(75) Inventors: Hong Jiang, Warren, NJ (US); Zulfiquar Sayeed, Hightstown, NJ (US); Paul A. Wilford, Bernardsville, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 311 days.

(21) Appl. No.: 13/552,800

(22) Filed: Jul. 19, 2012

(65) Prior Publication Data
US 2014/0023147 A1    Jan. 23, 2014

(51) Int. Cl.
| | |
|---|---|
| *H04N 19/39* | (2014.01) |
| *H04N 19/124* | (2014.01) |
| *H04N 21/2383* | (2011.01) |
| *H04N 21/61* | (2011.01) |
| *H04N 21/63* | (2011.01) |
| *H04N 19/65* | (2014.01) |

(52) U.S. Cl.
CPC .......... *H04N 21/2383* (2013.01); *H04N 19/39* (2014.11); *H04N 21/6131* (2013.01); *H04N 21/6143* (2013.01); *H04N 21/631* (2013.01); *H04N 19/124* (2014.11); *H04N 19/65* (2014.11)

(58) Field of Classification Search
None
See application file for complete search history.

(56) References Cited

U.S. PATENT DOCUMENTS

| | | | | |
|---|---|---|---|---|
| 5,673,307 | A  * | 9/1997  | Holland et al. | 455/436 |
| 2009/0044231 | A1* | 2/2009  | Oh et al. | 725/62 |
| 2010/0260254 | A1* | 10/2010 | Kimmich et al. | 375/240.01 |
| 2010/0296432 | A1* | 11/2010 | Mehta et al. | 370/315 |
| 2011/0164672 | A1* | 7/2011  | Jiang et al. | 375/240 |
| 2011/0228876 | A1* | 9/2011  | Song et al. | 375/295 |
| 2011/0311058 | A1* | 12/2011 | Oh et al. | 381/2 |
| 2012/0063455 | A1* | 3/2012  | Song et al. | 370/390 |
| 2012/0134373 | A1* | 5/2012  | Song et al. | 370/474 |

OTHER PUBLICATIONS

Zhao, "RD-based Adaptive UEP for H.264 Video Transmission in Wireless Networks," IEEE 2010 Int'l Conf. on Multimedia Information Networking and Security (MINES), Nov. 4-6, 2010, pp. 72-76.*

The International Search Report and the Written Opinion of the International Searching Authority, or the Declaration, in PCT/US2013/050234, Alcatel-Lucent USA Inc., Applicant, mailed Sep. 25, 2013, 12 pages.

Zenghua Zhao et al: "RD-Based Adaptive UEP for H.264 Video Transmission in Wireless Networks", Multimedia Information Networking and Security (MINES), 2010 International Conference on, IEEE, Piscataway, NJ, USA, Nov. 4, 2010, pp. 72-76, XP031837386, ISBN: 978-1-4244-8626-7.

\* cited by examiner

*Primary Examiner* — Jay Patel
*Assistant Examiner* — Reza Aghevli
(74) *Attorney, Agent, or Firm* — Wall & Tong, LLP (57) ABSTRACT

Methods and apparatus providing error protection in multicast-broadcast service by encoding multimedia content according to a first protocol to provide a plurality of distinct video streams, coding each of the distinct video streams using respective coding protocols, wherein each coding protocol has associated with it corresponding descriptors and coefficients, and multiplexing the coded video streams toward a wireless network.

20 Claims, 5 Drawing Sheets

CROSS LAYER CODING FOR SATELLITE MOBILE TV BROADCAST METHOD AND APPARATUS

TECHNICAL FIELD

The invention relates generally to communication networks and, more specifically but not exclusively, to mobile TV broadcasting.

BACKGROUND

Satellite systems are economical for use as a broadcast mechanism. As such, satellite broadcast of signals adapted for reception by mobile devices receivers such as those conforming to Long Term Evolution (LTE) and other wireless standards is appropriate. Unfortunately, satellite signals are susceptible to data loss due to long shadowing in which a signal is blocked by a bridge, building or other structure. Thus, when used to broadcast within the context of mobile applications, signal loss due to long shadowing may degrade the quality of user experience.

SUMMARY

Various deficiencies in the prior art are addressed by embodiments for providing error protection in multicast-broadcast service by encoding multimedia content according to a first protocol to provide a plurality of distinct video streams, coding each of the distinct video streams using respective coding protocols, wherein each coding protocol has associated with it corresponding descriptors and coefficients, and multiplexing the coded video streams toward a wireless network.

A method according to one embodiment comprises encoding multimedia content according to a first protocol; disassembling the encoded multimedia content to provide a plurality of distinct video streams; coding each one of the distinct video streams using respective coding protocols, wherein each coding protocol has associated with it corresponding descriptors and coefficients; multiplexing the coded video streams toward a wireless network.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention will be primarily described within the context of particular embodiments; however, those skilled in the art and informed by the teachings herein will realize that the invention is also applicable to other technical areas and/or embodiments.

Generally speaking, a cross layer coding for satellite mobile TV broadcast in a multimedia multicast-broadcast network is depicted and described herein, although various other capabilities also may be presented herein. In particular, the various embodiments contemplate the use of satellite-based services to provide broadcasting and/or multicasting of multimedia content such as television programs, movies, and the like to mobile devices generally adapted to terrestrial wireless networks. For example, multimedia broadcast-multicast services may include Multimedia Broadcast Multicast Service (MBMS) such as supported in existing Global System for Mobile Communications (GSM) and Universal Mobile Telecommunication System (UMTS) networks, Broadcast and Multicast Services (BCMCS) such as supported in existing Evolution-Data Optimized (EVDO) networks), Evolved MBMS (eMBMS) such as contemplated for Long Term Evolution (LTE) networks and so on.

In at least some embodiments, the multimedia multicast-broadcast coverage capability is adapted to provide error protection for multimedia multicast-broadcast services within an intended service coverage area resulting in bandwidth efficiency. The multimedia multicast-broadcast services may include any suitable types of multicast-broadcast services.

Evolved multimedia broadcast-multicast service (eMBMS) is a broadcast/multicast service of Long Term Evolution (LTE) network. In this arrangement, one stream is broadcast/multicast to different places where different channel conditions affect reception in different ways. In a region where the reception is fairly good, all bits are received. However, in a region with relatively bad reception not all bits are received therefore, requiring retransmission. eMBMS has very short time interleaver in the physical layer. As a result, it cannot handle fading of long channel coherence when terminals move at slow speed. Retransmission is used to handle long fading in cellular service where there is two-way communication between base stations and terminals. However, because broadcast/multicast service does not facilitate two-way communication, there is a need to handle long fading and long shadowing associated with this communication scheme.

In one embodiment, for example, orthogonal multiple description code (OMDC) is used to code the coefficients of a disassembled and compressed multimedia stream, for providing better quality versions of the multimedia content. The coded bit streams are multiplexed and propagated toward respective sets of the wireless service regions of the intended coverage area.

Although primarily depicted and described herein within the context of providing multimedia broadcast-multicast services within a cellular wireless network configured to provide multimedia broadcast-multicast services, it will be appreciated that the multimedia multicast-broadcast coverage capability may be adapted to provide service coverage for various other types of services and/or within various other types of networks (which may include cellular and non-cellular wireless networks).

Figure 1:
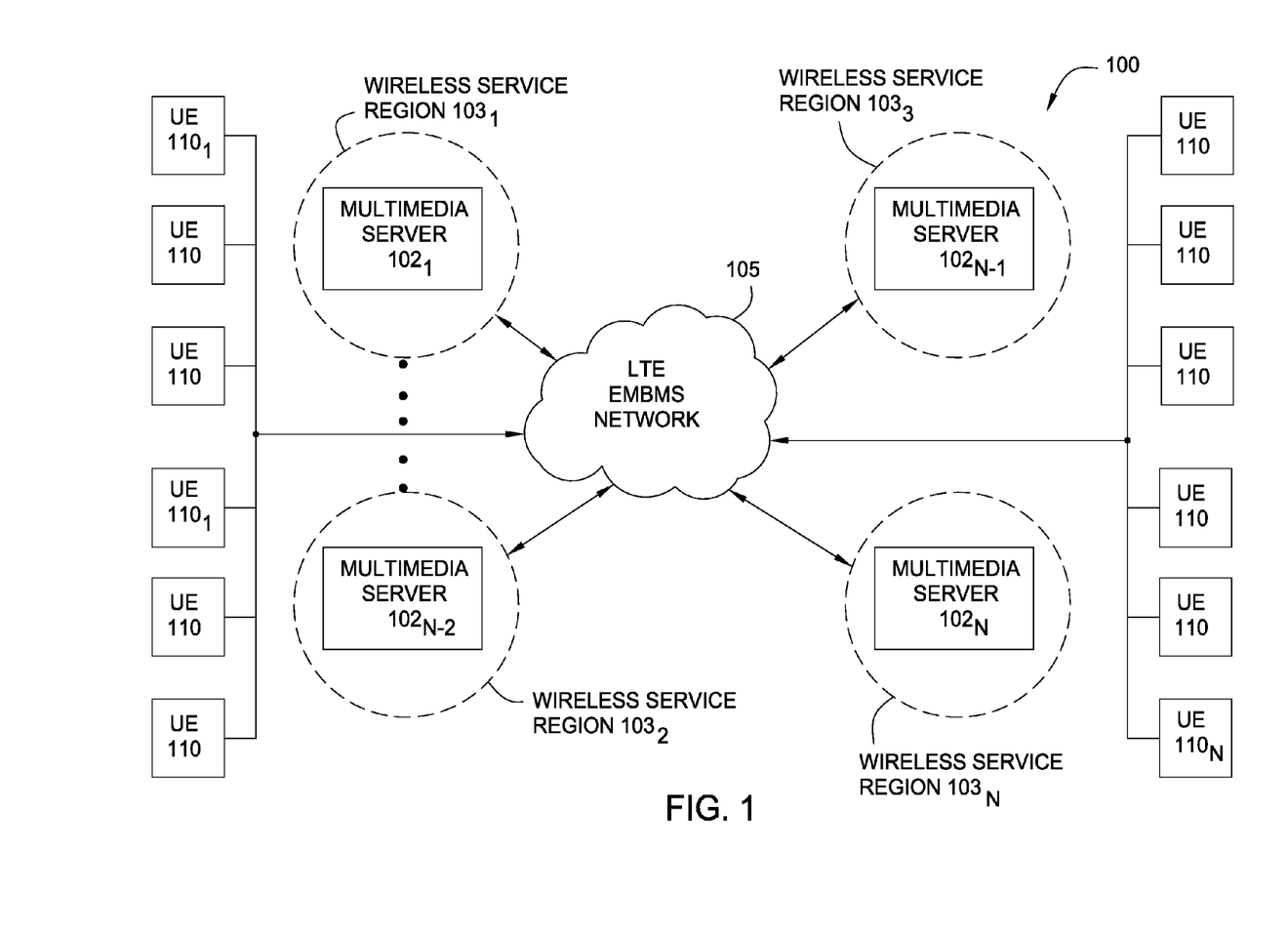
FIG. 1 depicts an exemplary wireless communication system configured to support an evolved multimedia broadcast-multicast service (eMBMS) according to an embodiment.

FIG. 1 depicts an exemplary wireless communication system configured to support an evolved multimedia broadcast-multicast service (eMBMS) according to an embodiment.

The exemplary communication system 100 supports a multimedia multicast-broadcast service configured for providing broadcast service and/or multicast service using various embodiments of the evolved multimedia broadcast-multicast coverage capability. The multimedia multicast-broadcast service may be any suitable type of multimedia multicast-broadcast service, which may depend on the type of wireless network used. For example, the multimedia multicast-broadcast service may be a Digital Video Broadcasting-Satellite to Handhelds (DVB-SH) network, an Evolved Multimedia Broadcast Multicast Service (eMBMS) service (e.g., as supported in LTE wireless networks), and the like. In one embodiment, in which the multimedia multicast-broadcast service is an eMBMS service, the eMBMS service is provided using an MBMS Single Frequency Network (MBSFN). The multimedia multicast-broadcast service provided by exemplary communication system 100 may include any other suitable type of broadcast and/or multicast service.

The exemplary communication system 100 includes a plurality of User Equipments (UEs) 110 (which also may be referred to herein as user devices (UDs) 110) and a number of network elements cooperating to provide a multimedia broadcast-multicast service to the UEs 110. The network elements include a plurality of multimedia servers $102_1$-$102_N$ (collectively, servers 102) and a Long Term Evolution (LTE) network 105.

UEs 110 receive wireless service from servers 102. The servers ($102_1$-$102_N$) provide wireless service to a plurality of wireless service regions $103_A$-$103_N$ (collectively, wireless service regions 103), respectively. In general, a wireless service region 103 of an associated server 102 is a geographic area within which UEs 110 may receive wireless service from the associated server 102. In many types of cellular wireless networks, the wireless service regions 103 are referred to as cellular regions or, more generally, as cells.

The multimedia servers 102 are configured to cooperate with the wireless networks 105 in a manner for providing a service to UEs 110 in an intended service coverage area (also referred to herein as an intended coverage area). The intended service coverage area for a service may be composed of some or all of the wireless service regions 103 of the servers 102 which support wireless service for the UEs 110. The service provided to an intended coverage area may include any suitable type of service which may be provided via servers 102 (e.g., a broadcast service for delivery of broadcast content to UEs 110, a multicast service for delivery of multicast content to UEs 110, and the like, as well as various combinations thereof).

It is noted that, although primarily depicted and described herein with respect to embodiments in which the service is a multimedia broadcast-multicast service for delivery of content to UEs, any other suitable type(s) of service may utilize the capabilities and functions of the multimedia multicast-broadcast coverage capability for providing service coverage within an intended coverage area.

LTE network 105 is an exemplary network only; other types of networks may be used within the context of the various embodiments. For example, Digital Video Broadcasting-Satellite to Handhelds (DVB-SH) network may be used. The basic configuration and operation of LTE networks will be understood by one skilled in the art. The exemplary LTE network includes eNodeBs and satellites providing communication paths as well as various components which have been omitted for purposes of clarity. The eNodeBs provide a radio access interface for UEs 110.

In one embodiment, eNodeBs incorporate multimedia server 102. In another embodiment, multimedia server 102 is a standalone computer system.

Multimedia server 102 is a source of content which may be provided to UEs 110 using a multimedia broadcast-multicast service. The multimedia server may access the content locally and/or remotely. The content may include various types of content, such as audio content, image and video content, multimedia content, and the like as well as various combinations thereof. The content may be managed as content items. For example, the content items may include television shows, movies, and the like.

The multimedia server may provide content items for delivery to an intended coverage area according to a schedule (e.g., such as where broadcast content is provided according to a predefined broadcast schedule) and/or in response to requests (e.g., such as where content is multicast to a set of UEs 102 after a threshold number of requests for the content are received). In the context of providing the multimedia multicast-broadcast coverage capability for delivering a content item to an intended coverage area, the multimedia server is configured to encode the content item to form multiple encoded layers of the content item which may be multiplexed and propagated to appropriate portions of the intended coverage area.

As described herein, the multimedia multicast-broadcast service has an intended coverage area associated therewith. The intended coverage area may be considered to cover a particular geographic area and, similarly, may be considered to be composed of a group of wireless service regions located within that particular geographic region.

In one embodiment, multimedia server 102 is configured to perform video compression of an original multimedia content for generating a disassembled video output. In this embodiment, a content item is compressed using standard coding protocol, e.g., MPEG2, H.264. The resulting video stream is then disassembled into a plurality of streams.

In one embodiment, the disassembled video output includes descriptors and coefficients. In another embodiment, the disassembled video output includes any number of components. It is noted that any suitable number of components may be supported to make available any suitable number of quality levels of the content item.

The term "descriptors" as used herein may include such elements as motion vectors, quantizer matrices, other frame descriptors and so on. The term "coefficients" as used herein may include transform coefficients of video compression and so on.

In one embodiment, the descriptors are coded according to a rateless code protocol, such as described in Digital Video Broadcasting-Handheld (DVB-H), Digital Video Broadcasting-Satellite to Handhelds (DVB-SH), Long Term Evolution (LTE) and the like, all of which are incorporated herein by reference in their respective entireties. In other embodiments, the descriptors are coded using any other suitable protocol.

The multimedia servers may be wireless access nodes providing radio interfaces via which UEs 110 may access the cellular wireless network. Multimedia servers 102 are configured to transmit wirelessly to UEs 110 and receive wirelessly from UEs 102.

The servers $102_1$-$102_N$ each receives the encoded and multiplexed multimedia content, processes the multimedia content and transmits the processed content within the wireless service regions $103_1$-$103_N$, respectively.

In one embodiment, the stream is demodulated and decoded in the physical layer. The stream is then demultiplexed into the coded descriptors and coded coefficients, which are decoded using respective decoder, i.e., rateless decoder, OMDC decoder. A video decoder then reconstructs the multimedia for presentation to the user.

UEs 110 include wireless user devices configured to receive content via a multimedia broadcast-multicast service. UEs 110 are configured to access the wireless network via one or more of the servers 102 (e.g., a UE 110 may communicate with a single server 110 at a time or may communicate with multiple servers 110 at a time). For example, UEs 110 may include feature phones, smart phones, tablets, laptops, and the like.

The protection for data loss due to long shadowing is provided with small overhead providing bandwidth efficiency. The embodiments described herein have low latency compared to conventional interleaving methods. This feature provides fast channel change time. The orthogonal multiple description codes herein described provides minimal degradation because the transmitted bits can be used either for loss protection or for improving video quality.

As noted herein, in addition to using OMDC in order to provide the multimedia broadcast-multicast coverage capability for a multimedia broadcast-multicast service, various other capabilities may be implemented in order to provide the multimedia broadcast-multicast coverage capability for a multimedia broadcast-multicast service.

Figure 2:
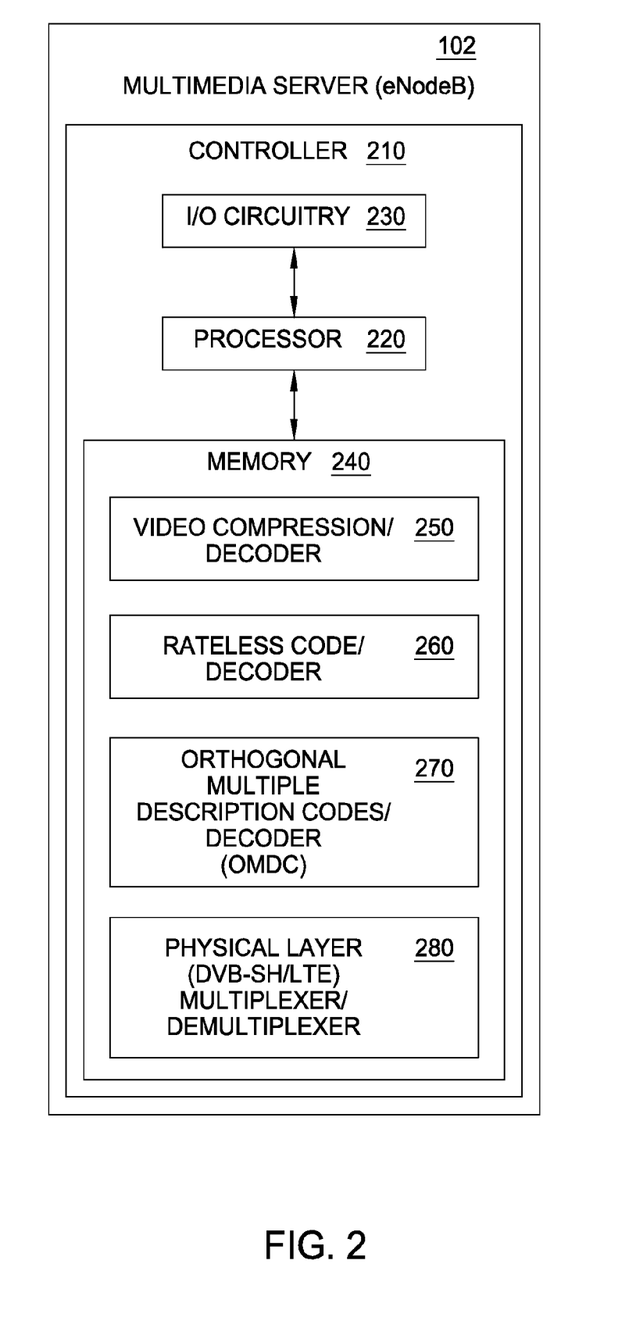
FIG. 2 depicts a multimedia server (eNodeB) suitable for use in the wireless communication network of FIG. 1.

FIG. 2 depicts an exemplary multimedia server (eNode B) suitable for use in the network system of FIG. 1. As depicted in FIG. 2, multimedia server 102 includes a controller 210 which includes a processor 220, I/O Circuitry 230 and a memory 240.

Processor 220 is adapted to cooperate with memory 240, I/O circuitry 230 to provide various wireless functions for the intended coverage area.

I/O circuitry 230 is adapted to facilitate communications with peripheral devices both internal and external to processor 220. For example, I/O circuitry 230 is adapted to facilitate communications with one or more user workstations (not shown), operations engine 280 and the like. In various embodiments, a connection is provided between processor ports and any peripheral devices used to program or otherwise manage the multimedia server functions.

Although primarily depicted and described with respect to operations engine 280, it will be appreciated that I/O circuitry 230 may be adapted to support communications with any other devices suitable for providing the wireless services associated with the intended coverage area.

Memory 240, generally speaking, stores data and software programs that are adapted for use in providing various multimedia server functions within the LTE network 105. The memory includes a Video compression/decoder (VCD) 250, Rateless coder/decoder (RCD) 260, Orthogonal multiple description coder/decoder (OMDC) 270 and Physical Layer (DVB-SH/LTE) Operations Engine (OE) 280) 280.

In one embodiment, VCD 250, RCD 260, and OMDC 270 are implemented using software instructions which may be executed by processor (e.g., controller 210) for performing the various functionalities depicted and described herein.

Although depicted and described with respect to an embodiment in which each of the engines, coder/decoder, and tools is stored within memory 240, it will be appreciated by those skilled in the art that the engines, coder/decoder, and/or tools may be stored in one or more other storage devices internal to memory 240 and/or external to memory 240. The engines, coder/decoder, and/or tools may be distributed across any suitable numbers and/or types of storage devices internal and/or external to memory 240. The memory 240, including each of the engines, coder/decoder, and tools of memory 240, is described in additional detail herein below.

As described herein, memory 240 includes VCD 250, RCD 260, OMDC 270 and OE 280, which cooperate to provide the various broadcast-multicast functions depicted and described herein. Although primarily depicted and described herein with respect to specific functions being performed by and/or using specific ones of the engines, coder/decoder, and/or tools of memory 240, it will be appreciated that any of the broadcast-multicast functions depicted and described herein may be performed by and/or using any one or more of the engines, coder/decoder, and/or tools of memory 240.

The engines and tools may be activated in any suitable manner. In one embodiment, for example, the engines and tools may be activated in response to manual requests initiated by network operators, in response to automated requests, or other multimedia servers and the like, as well as various combinations thereof.

For example, where an engine or tool is activated automatically, the engine or tool may be activated in response to scheduled requests, in response to requests initiated by multimedia server based on processing performed at the multimedia server. A description of the engines, coder/decoder, and tools of memory 240 follows.

As previously noted, various embodiments of an LTE network 105 include multimedia server 102 in communication with an infrastructure including UE 110 and/or eNodeBs.

The infrastructure is architected to provide the appropriate and necessary wireless services offered by the network service provider. The network service provider manages the network to provide its service offerings to its wireless/mobile users in a manner consistent with the consumer expectations. For example, wireless/mobile users (e.g., users of standard telephones, smart phones, computers and the like purchasing various voice, data or other service offerings) expect near perfect telephone/voice service, very near perfect data services, glitch-free streaming media and the like. Third party service providers purchasing service bundles for their own users expect the same, as well as management level interfaces and other mechanisms to provide interoperability between the various networks. Customer expectations may comprise an assumed or expected level of service, a level of service defined in a service level agreement (SLA) and the like.

Various embodiments are directed toward providing error protection without wasting bandwidth wherein each of the various components is adapted to the specific infrastructure necessary to support that functionality.

For example, Video compression/decoder (VCD) 250 provides video compression using standard coding protocol, e.g., MPEG2, H.264. The output is a disassembled stream comprising descriptors and coefficients. Generally, descriptor carries information about aspect ratio and active picture characteristics.

In one embodiment, on the transmission side, RCD 260 codes the descriptors. The bits are coded into frames. A number N packets of source data is encoded into 1 frame of M packets such that M>N. Thus, the code rate could be derived as N/M. The frame of M encoded packets is transmitted toward the intended area of coverage. As stated above, descriptors are motion vectors, quantizer matrices and as such cannot tolerate errors. Enough packets need be transmitted so that the remaining packets can be used to reconstruct the video frame. Any L (N<L<=M) correctly received packets can be used to completely recover the original N packets of useful data.

In one embodiment, on the reception side, the stream is demultiplexed into the coded descriptors and coefficients after the physical layer demodulation and decoding performed by OE 280. RCD 260 would perform the inverse operation decoding the descriptors, which are fed to video decoder 250 for reconstruction of the multimedia.

In one embodiment, the coefficients are coded using OMDC 270. Information is sent with redundancy (orthogonal multiple descriptions). The redundancy can be used to improve the quality of information transmitted. The redundancy can also be used to detect and correct errors in the transmission. In conjunction with a broadcast-multicast system such as DVB-SH or LTE, eMBMS, OMDC provides error protection without wasting bandwidth. OMDC is further described below in conjunction with FIG. 3.

Figure 3:
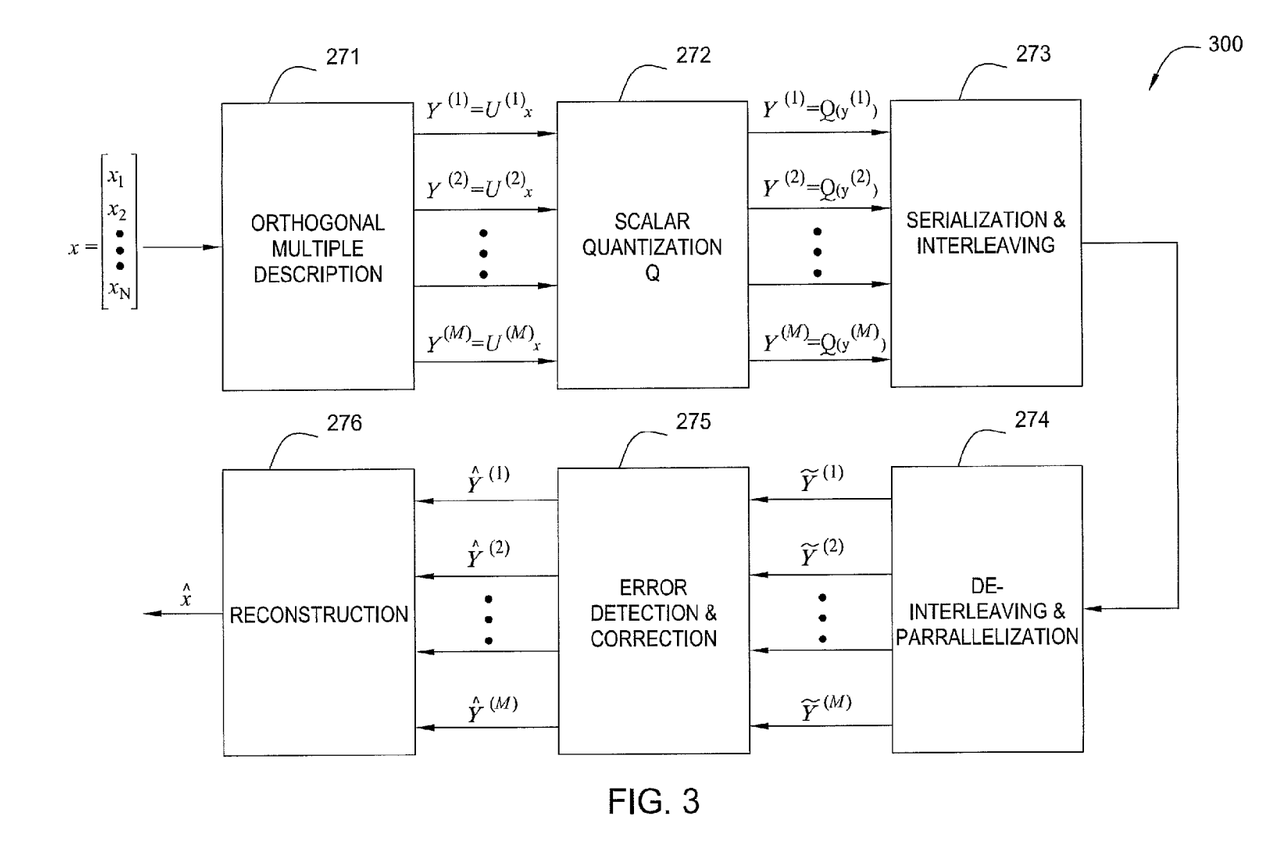
FIG. 3 depicts one embodiment of Orthogonal multiple description codes (OMDC) used to encode multimedia content to support delivery of the multimedia content to an intended coverage area.

In one embodiment as depicted in FIG. 3, the orthogonal multiple description generation circuitry generates M descriptions $y^{(i)}$ of a vector x by applying respective ones of the orthogonal matrices to the vector x in accordance with the following equation:

$$y^{(i)} = U^{(i)} x, i = 1, \ldots, M.$$

The term "applying" as used herein in the context of applying a matrix is intended to be construed broadly so as to encompass multiplication by the matrix as in the present embodiment or other processing that utilizes the matrix.

One example of a set of orthogonal matrices suitable for use in this illustrative embodiment is the set of orthogonal matrices given by:

$$U^{(1)} = I - \frac{2}{(v^{(1)})^T v^{(1)}} v^{(1)} (v^{(1)})^T$$

$$U^{(i)} = U^{(i-1)} \left( I - \frac{2}{(v^{(i)})^T v^{(i)}} v^{(i)} (v^{(i)})^T \right), i = 2, \ldots M$$

where $r_i, i=1,2,\ldots,NM$ is a sequence of random numbers in a specified interval, and $$v^{(i)} = \begin{bmatrix} r_{(i-1)N+1} \\ r_{(i-1)N+2} \\ \vdots \\ r_{(i-1)N+N} \end{bmatrix}, i = 1, \ldots, M.$$

Other types of orthogonal matrices may be used in other illustrative embodiments. For example, the orthogonal matrices may be given by:

$$U = [u^{(0)}, u^{(1)}, \ldots, u^{(N-1)}],$$

where $u^{(i)}, i=0,\ldots,N-1$ is a set of orthonormal vectors generated by applying an orthogonalization process to a sequence of vectors $v^{(i)}, i=0,1\ldots$, of length N, whose components are random numbers.

The illustrative embodiments provide significant advantages over conventional approaches. For example, in one or more of these embodiments, the orthogonal matrices introduce redundancy in such a way that the redundancy can be used not only to improve signal reconstruction quality, but also to detect and correct errors in the received signal. The multiple descriptions therefore, have error detection and correction capability built into them. This avoids the need to dedicate additional bandwidth for Forward Error Correction (FEC) and Cyclic Redundancy Correction (CRC), thereby ensuring that there will be no wasted bandwidth in the absence of errors, while also providing graceful degradation in the presence of errors.

Although primarily depicted and described herein with respect to embodiments for providing coverage for specific types of broadcast-multicast services, it is noted that various functions of the multimedia multicast-broadcast coverage capability may be used to provide coverage for other types of multimedia broadcast-multicast services, e.g., broadcast-only services, multicast-only services.

Although primarily depicted and described herein with respect to embodiments for providing coverage for broadcast-multicast services, it is noted that various functions of the multimedia multicast-broadcast coverage capability may be used to provide coverage for other suitable types of services (i.e., other than broadcast and multicast services).

As described herein, the multimedia broadcast-multicast coverage capability may be provided within any suitable type of wireless network and, thus, the disclosed multimedia server may be associated with any suitable type of cellular network. In one embodiment, for example, these elements are implemented as part of the multicast-broadcast portion of a Digital Video Broadcasting-Satellite to Handhelds (DVB-SH) wireless network (e.g., where multimedia servers 102 are NodeBs). In another embodiment, for example, multimedia servers 102 are implemented as part of a multicast-broadcast portion of an LTE wireless network (e.g., multimedia servers 102 are eNodeBs). These elements may be implemented within any other suitable type of wireless network (using any suitable elements of the wireless network) configured to support a multimedia broadcast-multicast service.

FIG. 3 depicts one embodiment of Orthogonal multiple description codes (OMDC) used to encode multimedia content to support delivery of the multimedia content to an intended coverage area.

In this embodiment, on the transmission side OMDC 270 includes an orthogonal multiple description generator module 271, a scalar quantization module 272 and a serialization and interleaving module 273. On the receiving side, OMDC 270 comprises a de-interleaving and parallelization module 274, an error detection and correction module 275, and a reconstruction module 276. The modules 271, 272 and 273 may be viewed, for example, as collectively comprising an implementation of the orthogonal multiple description encoder component of OMDC 270. Similarly, the modules 274, 275 and 276 may be viewed, for example, as collectively comprising an implementation of the orthogonal multiple description decoder of OMDC 270.

The various modules shown in FIG. 3 may be viewed as examples of circuitry used to implement the associated functionality. Such circuitry may comprise well-known conventional encoding and decoding circuitry suitably modified to operate in the manner described herein. For example, portions of such circuitry may comprise processor and memory circuitry associated with the processor 220, memory 240. Other examples include matrix multiplication circuitry or other types of arithmetic logic circuitry, digital signal processors, transceivers, etc. Conventional aspects of such circuitry are well known to those skilled in the art and therefore will not be described in detail herein.

In the FIG. 3 embodiment, x denotes a message to be transmitted, and more particularly comprises a vector of real numbers:

$$x = \begin{bmatrix} x_1 \\ x_2 \\ \vdots \\ x_N \end{bmatrix}$$

For example, x may be a set of transform coefficients generated in a speech coding, image compression or video compression process. As more particular examples for the case of JPEG image compression, x can be 8×8 DCT coefficients, x can be a row or a column of 8×8 DCT coefficients, x can be DCT coefficients of Y, Cr, Cb at one pixel, or x can be combinations of different types of such coefficients. Of course, as previously indicated, a wide variety of other types of information can be transmitted using the orthogonal multiple description coding techniques disclosed herein.

The original message x to be transmitted is applied to the orthogonal multiple description generator 271. From this original message, M messages are generated. These messages are called orthogonal multiple description messages. Each of the M messages is a description of the original message x. Any orthogonal multiple description message, or any subset of these messages, can be used to reconstruct an approximation to the original message. The more messages that are used in the reconstruction, the more accurately the reconstructed message approximates the original message.

In the present embodiment, the orthogonal multiple description messages are generated in module 202 in the following manner. Let M=2k+1 be a positive integer, and let $U^{(i)}, i=1,2,\ldots,M$ be orthogonal matrices of dimension N×N:

$$(U^{(i)})^T U^{(i)} (U^{(i)})^T = I, i=1,\ldots,M,$$

where I is the N×N identity matrix, and T indicates a matrix transpose operation. The M messages are generated by applying respective ones of the orthogonal matrices to the original message x:

$$y^{(i)} = U^{(i)} x, i=1,\ldots,M.$$

The resulting messages are quantized in module 272 using a scalar quantization function:

$$Y^{(i)} = Q(y^{(i)}) = Q(U^{(i)} x) i=1,\ldots,M$$

The quantized messages are serialized and interleaved in module 273. In one embodiment, the coded bit streams (e.g., descriptors coded using Rateless code and coefficients coded using OMDC) are multiplexed and transmitted in the physical layer associated with OE 280.

In one embodiment, the coded bit streams comply with the requirements of Digital Video Broadcasting-Satellite to Handhelds (DVB-SH) network. In another embodiment, the coded bit streams comply with the requirements of Long Term Evolution (LTE) network. As described herein, the multimedia broadcast-multicast coverage capability may be provided within any suitable type of wireless network.

In one embodiment, the data received over the network is demodulated and decoded in the physical layer associated with OE 280. After demodulation, the stream is demultiplexed into the coded descriptors and coded coefficients.

In one embodiment, the coded descriptors are decoded using rateless decoder 260. In another embodiment, the stream is de-interleaved and parallelized in module 270 to form received messages:

$$\tilde{Y}^{(i)}, i=1,\ldots,M$$

The received messages $\tilde{Y}^{(i)}$ may be different from the respective transmitted messages $Y^{(i)}$ due to errors attributable to transmission through network 105.

In one embodiment, error detection and correction are performed in module 275 to generate estimated messages:

$$\hat{Y}^{(i)}, i=1,\ldots,M$$

The estimated messages $\hat{Y}^{(i)}, i=1,\ldots,M$ are used in reconstruction module 276 to generate an estimate $\hat{x}$ approximating the original message x.

An example of the M orthogonal matrices utilized to generate respective ones of the multiple descriptions in generator 202 will now be described in detail. An N×N matrix U is orthogonal if $U^T U = U U^T = I$. Let $r_i, i=1,2,\ldots,NM$ be a sequence of random numbers in the interval [0,1]. Define M vectors, each of length N, by $$v^{(i)} = \begin{bmatrix} r_{(i-1)N+1} \\ r_{(i-1)N+2} \\ \vdots \\ r_{(i-1)N+N} \end{bmatrix}, i=1,\ldots,M$$

The orthogonal matrices may then be computed as follows:

$$U^{(1)} = I - \frac{2}{(v^{(1)})^T v^{(1)}} v^{(1)} (v^{(1)})^T$$

$$U^{(i)} = U^{(i-1)} \left( I - \frac{2}{(v^{(i)})^T v^{(i)}} v^{(i)} (v^{(i)})^T \right), i=2,\ldots M$$

It should be noted that many other techniques may be used to generate orthogonal matrices for use in orthogonal multiple description coding in various embodiments. Another embodiment for generating orthogonal matrices will now be described.

Let $v^{(i)}, i=0,1\ldots$, be a sequence of vectors of length N, whose components are random numbers. An orthogonalization process, such as the Gram-Schmidt process which is well-known to those skilled in the art, can be used to create a set of N orthonormal vectors $u^{(i)}, i=0,\ldots,N-1$. The orthonormal vectors have the property:

$$(u^{(i)})^T u^{(j)} = \begin{cases} 1, & i=j \\ 0, & i \neq j. \end{cases}$$

After the orthonormal vectors are created, they can be used to form the columns of an orthogonal matrix as follows:

$$U = [u^{(0)}, u^{(1)}, \ldots u^{(N-1)}].$$

More of such orthogonal matrices can be generated by using more sequences of vectors $v^{(i)}, i=0,1\ldots$, with random components.

Again, the foregoing techniques for generating orthogonal matrices are presented by way of illustrative example only, and numerous other orthogonal matrix generation techniques may be used in implementing the various embodiments.

As noted above, for each orthogonal matrix $U^{(i)}$, we generate $y^{(i)} = U^{(i)} x$, and $y^{(i)}$ is then quantized using scalar quantization to generate transmitted messages. The transmitted messages are $$Y^{(i)} = Q(y^{(i)}) = Q(U^{(i)} x) = U^{(i)} x + \Delta^{(i)}, i=1,\ldots,M$$

where $\alpha^{(i)} = (\Delta_1^{(i)}, \Delta_2^{(i)}, \ldots, \Delta_N^{(i)})^T$, is the quantization error. Assume that $\Delta_p^{(i)}, \Delta_q^{(j)}, i \neq j$ or $p \neq q$, are mutually independent random variables with uniform distribution in $$\left[ -\frac{1}{2}, \frac{1}{2} \right].$$

Let the variance of the quantization error in each message be $$\sigma^2 = E((\Delta^{(i)})^T \Delta^{(i)}), i=1,2,\ldots M,$$

where $E(\cdot)$ denotes expected value.

Reconstruction in the absence of error proceeds as follows. Any number of transmitted messages can be used to reconstruct the original message x. Let $Y^{(i_1)}, Y^{(i_2)}, \ldots, Y^{(i_p)}$ be p transmitted messages. One example of the manner in which the original message can be reconstructed in module 276 is as follows:

$$\hat{x}^p = \frac{1}{p}\sum_{q=1}^{p}(U^{(i_q)})^T Y^{(i_q)}.$$

The variance of the error in the reconstructed message in this example is $$E((x-\hat{x}^p)^T(x-\hat{x}^p)) = E\left(\left(x - \frac{1}{p}\sum_{q=1}^{p}(U^{(i_q)})^T Y^{(i_q)}\right)^T \left(x - \frac{1}{p}\sum_{q=1}^{p}(U^{(i_q)})^T Y^{(i_q)}\right)\right)$$

$$= \frac{1}{p^2}E\left(\sum_{q=1}^{p}(U^{(i_q)}\Delta^{(i_q)})^T \sum_{q=1}^{p}U^{(i_q)}\Delta^{(i_q)}\right)$$

$$= \frac{1}{p^2}E\left(\sum_{q=1}^{p}(\Delta^{(i_q)})^T \Delta^{(i_q)}\right)$$

$$= \frac{1}{p^2}\sum_{q=1}^{p}E((\Delta^{(i_q)})^T \Delta^{(i_q)})$$

$$= \frac{1}{p^2}p\sigma^2$$

$$= \frac{\sigma^2}{p}$$

Thus, in this example, as p gets larger, the variance of the error gets smaller. This implies that the more error free messages are used in the reconstruction, the more accurate the reconstruction becomes.

The error detection and correction implemented in module 275 will now be described in greater detail. If M=2k+1 orthogonal messages are generated and transmitted, and if at most k received messages contain errors, then the messages that contain large error can be detected and corrected. The error detection and correction can be achieved in $O(M^2)$ operations, that is, the number of operations has a magnitude on the order of $M^2$, which is computationally manageable. Define the channel error in the received message as $e^{(i)} = \hat{Y}^{(i)} - Y^{(i)}$, where $\hat{Y}^{(i)}$ is the received message of the transmitted $Y^{(i)}$. Define the norm of the channel error as $\|e^{(i)}\| = (e^{(i)})^T e^{(i)}$. Define the maximum quantization error as $\delta = \max\{\|\Delta^{(i)}\|, i=1,\ldots,M\}$. The received error is defined to be large if $\|e^{(i)}\| > 4\delta$. Also define an error syndrome as $$\in(i,j) = \hat{Y}^{(i)}(U^{(j)})^T \hat{Y}^{(j)}, \|\in(i,j)\| = \in(i,j)^T \in(i,j)$$

It is clear from the above definition that $$\in(j,i) = -U^{(j)}(U^{(i)})^T \in(i,j), \|\in(i,j)\| = \|\in(j,i)\|$$

It can be shown that if the received message with index p contains a large error, i.e., if $\|e^{(p)}\| > 4\delta$, then there are at least k+1 messages with index i for which $\|\in(i,p)\| > 2\delta$. This is referred to herein as Property 1, and can be shown in the following manner. The error in the message with index p is given by $e^{(p)} = \hat{Y}^{(p)} - Y^{(p)}$. Since there are at most k messages that contain errors, there are at least k+1 messages that do not contain errors. Define the set containing all indices of messages received without error as $$S_c\{i | \hat{Y}^{(i)} = Y^{(i)}\}$$

Then, the cardinality of $S_c$, which is the number of indices in $S_c$, satisfies $|S_c| \geq k+1$. Let $i \in S_c$, then $$\varepsilon(i,p) = \hat{Y}^{(i)} - U^{(i)}(U^{(p)})^T \hat{Y}^{(p)}$$
$$= Y^{(i)} - U^{(i)}(U^{(p)})^T (Y^{(p)} + e^{(p)})$$
$$= U^{(i)}x + \Delta^{(i)} - U^{(i)}(U^{(p)})^T (U^{(p)}x + \Delta^{(p)} + e^{(p)})$$
$$= \Delta^{(i)} - U^{(i)}(U^{(p)})^T \Delta^{(p)} - U^{(i)}(U^{(p)})^T e^{(p)}$$

$$\|\varepsilon(i,p)\| \geq \|U^{(i)}(U^{(p)})^T e^{(p)}\| - \|\Delta^{(i)} - U^{(i)}(U^{(p)})^T \Delta^{(p)}\| \geq \|e^{(p)}\| - 2\delta > 2\delta$$

The above shows that any index i in $S_c$ has the property $\|\in(i,p)\| > 2\delta$. Since there are at least k+1 indices in $S_c$, this proves Property 1.

Again assume that M=2k+1 and assume at most k received messages contain errors. If a received message with index p contains no error, then there are at most k messages with index i for which $\|\in(i,p)\| > 2\delta$. This is referred to herein as Property 2, and can be shown in the following manner. Since the message with index p has no error, $\hat{Y}^{(p)} = Y^{(p)}$. Let $i \in S_c$, then $$\varepsilon(i,p) = \hat{Y}^{(i)} - U^{(i)}(U^{(p)})^T \hat{Y}^{(p)}$$
$$= Y^{(i)} - U^{(i)}(U^{(p)})^T Y^{(p)}$$
$$= U^{(i)}x + \Delta^{(i)} - U^{(i)}(U^{(p)})^T (U^{(p)}x + \Delta^{(p)})$$
$$= \Delta^{(i)} - U^{(i)}(U^{(p)})^T \Delta^{(p)}$$

$$\|\varepsilon(i,p)\| = \|\Delta^{(i)} - U^{(i)}(U^{(p)})^T \Delta^{(p)}\| \leq 2\delta$$

Therefore, there are at least k+1 messages with index i for which $\|\in(i,p)\| \leq 2\delta$. Since there are a total of 2k+1 messages, there are no more than k messages with index i for which $\|\in(i,p)\| > 2\delta$. This proves Property 2.

Error detection based on the above principles is implemented in module 275 as follows. For M=2k+1 received messages $\tilde{Y}^{(i_1)}$, i=1, ..., M, compute the syndromes $\|\in(i,j)\|$, i,j=1, ..., M. Note the symmetry $\|\in(i,j)\| = \|\in(j,i)\|$. Therefore, only a total number of M(M+1)/2 syndromes need to be computed. Then, find all messages with index p, such that there are at least k+1 syndromes having $\|\in(i,p)\| > 2\delta$. Any message which has a large error must be one of such messages, according to Property 1. Furthermore, any such message must contain an error, because, according to Property 2, a message without error can have at most k syndromes with $\|\in(i,p)\| > 2\delta$. Formally define $S_L = \{p|$ there are at least k+1 messages with index i such that $\|\in(i,p)\| > 2\delta\}$.

Then, the sets $S_L$ and $S_c$ have no intersection, i.e., $S_L \cap S_c = \phi$. All messages with large errors must have their index in $S_L$, i.e., if $\|e^{(i)}\| > 4\delta$, then $i \in S_L$. Also, all messages with an index not in $S_L$, either have no error, or have small errors, since if $i \notin S_L$, then $\|e^{(i)}\| \leq 4\delta$.

The received messages with large errors are detected using the previous algorithm and their indices are collected in the set $S_L$. These messages can be corrected using the following algorithm, also implemented in module 275.

Let $P = |S_L|$, the number of indices in $S_L$. For each detected message with index $p \in S_L$, the corrected message is defined by $$\hat{Y}^{(p)} = \frac{1}{M-P} \sum_{i \notin S_L} U^{(p)}(U^{(i)})^T \tilde{Y}^{(i)}$$

The above corrected message may not equal the transmitted message PP) exactly, but the purpose is not to find the transmitted messages; the purpose is rather to reconstruct the original message.

The error in the corrected message as compared to the original message is $$\hat{Y}^{(p)} - U^{(p)}x = \frac{1}{M-P}\left(\sum_{i \notin S_L} U^{(p)}(U^{(i)})^T \Delta^{(i)} + \sum_{i \in S_L \cup S_c} U^{(p)}(U^{(i)})^T e^{(i)}\right)$$

$$E\left(\left(\hat{Y}^{(p)} - U^{(p)}x\right)^T \left(\hat{Y}^{(p)} - U^{(p)}x\right)\right) \leq$$

$$\frac{1}{(2k+1-P)^2}((2k+1-P)\sigma^2 + (k-P)16\delta^2) \leq$$

$$\frac{1}{2k+1-P}\sigma^2 + \frac{16(k-P)}{(2k+1-P)^2}\delta^2$$

The above error can be made arbitrarily small by increasing k.

After error detection, the original message may be approximated by reconstruction:

$$\hat{x} = \frac{1}{2k+1-P} \sum_{i \notin S_L} (U^{(i)})^T \tilde{Y}^{(i)}$$

The above reconstructed message X may not be equal to the original message x, but it is a good approximation of the original message. The error in the reconstructed message 2, as compared to the original message X, is the same as given previously, that is $$E\left((\hat{x}-x)^T(\hat{x}-x)\right) \leq \frac{1}{2k+1-P}\sigma^2 + \frac{16(k-P)}{(2k+1-P)^2}\delta^2$$

which again can be made arbitrarily small by increasing k.

Note that there is no gain of accuracy to use the corrected messages $\hat{Y}^{(i)}$, $i \in S_L$, in place of the estimated messages $\tilde{Y}^{(i)}$, $i \in S_L$, for the exemplary reconstruction and error correction techniques described above. However, it is also possible to use other reconstruction techniques, such as those described in the above-cited V. Goyal reference, and an additional gain in accuracy may be achieved by using the corrected messages in such reconstruction.

As noted previously, the above-described orthogonal multiple description coding techniques are advantageous in that the redundancy introduced by the use of orthogonal matrices to generate the multiple descriptions can be used not only to improve signal reconstruction quality, but also to detect and correct errors in the received signal. This avoids the need to dedicate additional bandwidth for FEC and CRC, thereby ensuring that there will be no wasted bandwidth in the absence of errors, while also minimizing degradation in the presence of errors.

A variety of alternative embodiments of the FIG. 3 system are possible. For example, one such embodiment may include only modules 271, 272, 275 and 276, with the serialization and interleaving functionality eliminated. In such an arrangement, the multiple descriptions at the output of the quantizer 272 may be transmitted over respective separate parallel channels, rather than serialized and interleaved.

It is also possible for a given embodiment to include only error detection capability, rather than both error detection and error correction capability as in the FIG. 3 embodiment. A module corresponding generally to module 275 but configured only to detect errors is an example of what is more generally referred to herein as "error protection circuitry." Such circuitry is also intended to encompass module 275.

Figure 4:
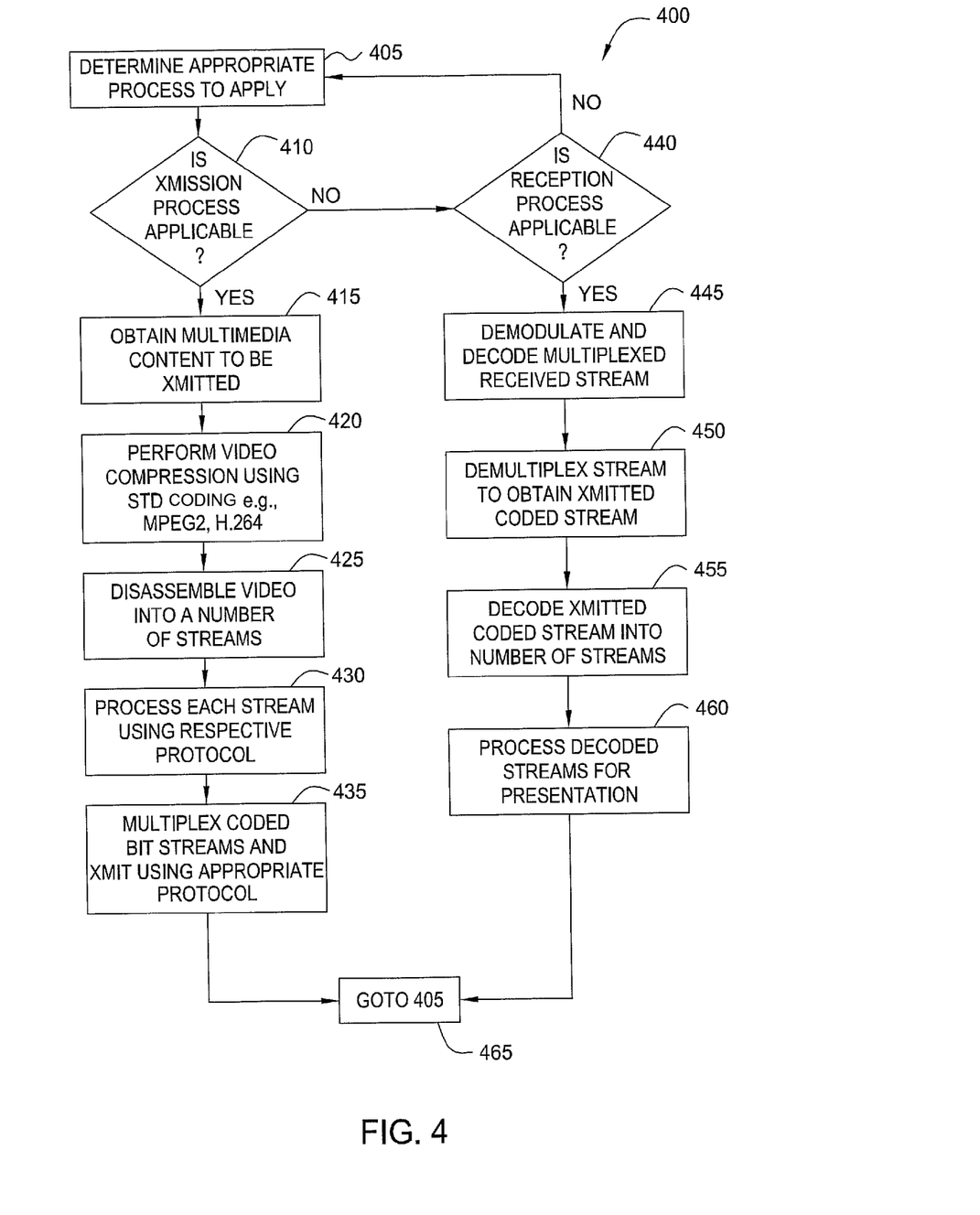
FIG. 4 depicts one embodiment of a method for using cross layer coding for satellite mobile TV using a multimedia broadcast-multicast service.

FIG. 4 depicts one embodiment of a method for using cross layer coding for satellite mobile TV using a multimedia broadcast-multicast service.

At step 405, the method determines the appropriate process to apply in the operation.

Referring to box 410, the method determines if the applicable process is transmission of multimedia content. If yes, then step 415 is executed where the method retrieves or obtains the multimedia content to be transmitted.

At step 420, the method performs video compression using standard coding protocol, e.g., MPEG2, H.264.

Referring to box 425, the method disassembles the video into a number of streams. One known method for performing such operation is the Hybrid automatic repeat request (H-ARQ) protocol. However, with this method the number of transmissions is predetermined and it is fixed for the entire network. For channels in the network that experience short fading or short shadowing, retransmission is not necessary; and the terminals in such channels receive multiple identical messages thereby leading to the inefficient use of bandwidth. On the other hand, for channels in the network that experience long fading or long shadowing, the number of transmissions may not be enough, and the terminals in such channels may not receive any correct messages.

At step 430, the method processes each stream using a respective protocol. In one embodiment, OMDC is used. In another embodiment,
Rateless code is used.

At step 435, the coded bit streams are multiplexed and transmitted in the physical layer.

At step 440, the method determines if the applicable process is reception of multimedia content. If yes, step 445 is executed where the method demodulates and decodes the or more multiplexed received streams.

At step 450, the method demultiplexed the or more multiplexed received streams to obtain the transmitted coded streams.

At step 455, the method decodes the transmitted coded streams into a number of streams using respective decoder.

At step 460, the method processes the decoded streams and propagates the streams toward a presentation device.

At step 465, the method ends.

Figure 5:
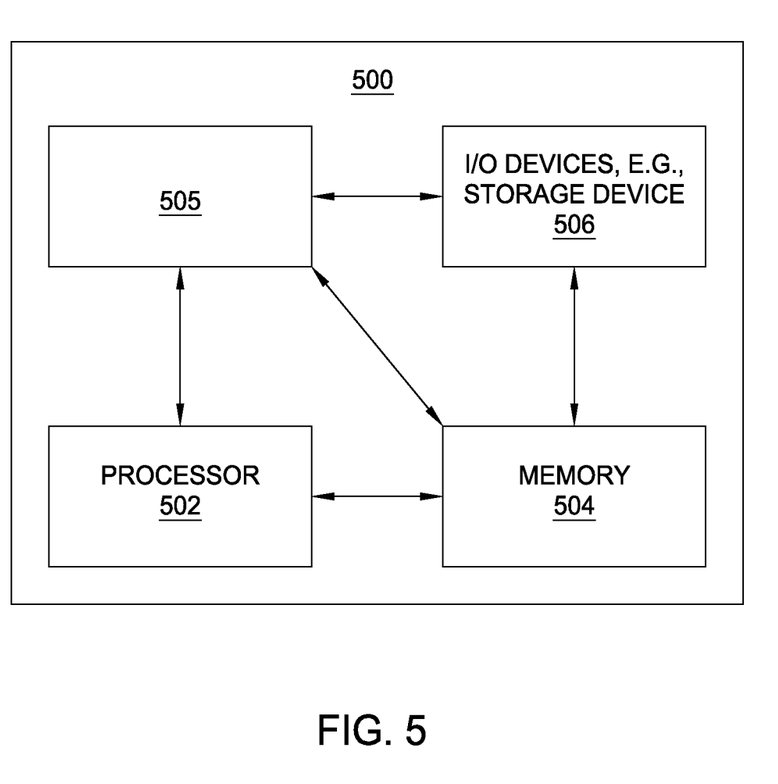
FIG. 5 depicts a high-level block diagram of a computer suitable for use in performing the functions described herein.

FIG. 5 depicts a high-level block diagram of a computer suitable for use in performing functions described herein.

As depicted in FIG. 5, computer 500 includes a processor element 502 (e.g., a central processing unit (CPU) and/or other suitable processor(s)) and a memory 504 (e.g., random access memory (RAM), read only memory (ROM), and the like). The computer 500 also may include a cooperating module/process 505 and/or various input/output devices 506 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software (e.g., via implementation of software on one or more processors) and/ or hardware (e.g., using a general purpose computer, one or more application specific integrated circuits (ASIC), and/or any other hardware equivalents).

It will be appreciated that the functions depicted and described herein may be implemented in software for executing on a general purpose computer (e.g., via execution by one or more processors) so as to implement a special purpose computer, and/or may be implemented in hardware (e.g., using one or more application specific integrated circuits (ASIC) and/or one or more other hardware equivalents).

In one embodiment, the cooperating process 505 can be loaded into memory 504 and executed by processor 502 to implement functions as discussed herein. Thus, cooperating process 505 (including associated data structures) can be stored on a computer readable storage medium, e.g., RAM memory, magnetic or optical drive or diskette, and the like.

It will be appreciated that computer 500 depicted in FIG. 5 provides a general architecture and functionality suitable for implementing functional elements described herein and/or portions of functional elements described herein. For example, the computer 500 provides a general architecture and functionality suitable for implementing one or more of multimedia server 102, a portion of multimedia server 102, and the like. It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed:

1. A method, comprising:
encoding multimedia content according to a first protocol;
disassembling the encoded multimedia content to provide a plurality of distinct video streams comprising descriptors and coefficients;
coding each of the plurality of distinct video streams using a respective one of a plurality of coding protocols which are distinct from the first protocol; and
multiplexing the coded video streams for transmission toward a user equipment (UE) via a wireless network, each of said multiplexed coded video streams being configured for UE decoding using a corresponding decoding protocol adapted to minimize long shadowing and long fading effects by using error detection and correction for reconstructing the multimedia content.

2. The method of claim 1, wherein the first protocol for processing multimedia content comprises a video compression using MPEG2.

3. The method of claim 1, wherein the first protocol for processing multimedia content comprises a video compression using H.264.

4. The method of claim 1, wherein at least one distinct video stream of the plurality of distinct video streams comprises only corresponding descriptor out of the descriptors.

5. The method of claim 4, wherein the descriptors comprise any of motion vectors, quantizer matrices and frame descriptors.

6. The method of claim 4, wherein the descriptors are coded using Rateless code.

7. The method of claim 1, wherein at least one distinct video stream of the plurality of distinct video streams comprises only corresponding coefficients out of the coefficients.

8. The method of claim 7, wherein said coefficients are transform coefficients of video compression.

9. The method of claim 7, wherein the coefficients are coded using Orthogonal multiple description codes (OMDC).

10. The method of claim 1, wherein the first protocol comprises a decompression technique.

11. A method for adapting a multiplexed version multimedia content for presentation by a device, the method comprising:
receiving the multiplexed version of the multimedia content having an original encoding rate associated therewith;
processing the multiplexed version of the multimedia content to form a demodulated and decoded stream of the multimedia content according to a first protocol;
demultiplexing the demodulated and decoded stream of multimedia content into a plurality of distinct coded video streams comprising respective descriptors and coefficients;
decoding each of the plurality of distinct coded video streams using a respective decoding protocol of a plurality of protocols which are distinct from the first protocol, said respective decoding protocol being adapted to minimize long shadowing and long fading effects using error detection and correction for reconstructing the multimedia content; and
propagating the decoded streams toward a presentation device for communicating the multimedia content.

12. The method of claim 11, wherein the coded descriptors are decoded using a Rateless decoder.

13. The method of claim 11, wherein the coded coefficients are decoded using an Orthogonal multiple description codes (OMDC) decoder.

14. A non-transitory computer-readable storage medium storing instructions which, when executed by a computer, cause the computer to perform a method for efficiently processing a multimedia content, the method comprising:
encoding multimedia content according to a first protocol;
disassembling the encoded multimedia content to provide a plurality of distinct video streams comprising descriptors and coefficients;
coding each of the plurality of distinct video streams using a respective one of a plurality of coding protocols which are distinct from the first protocol; and
multiplexing the coded video streams for transmission toward a user equipment (UE) via a wireless network, each of said multiplexed coded video streams being configured for UE decoding using a corresponding decoding protocol adapted to minimize long shadowing and long fading effects by using error detection and correction for reconstructing the multimedia content.

15. An apparatus for efficiently processing a multimedia content, the apparatus comprising:
a processor configured for:
encoding multimedia content according to a first protocol;
disassembling the encoded multimedia content to provide a plurality of distinct video streams comprising descriptors and coefficients;

coding each of the plurality of distinct video streams using a respective one of a plurality of coding protocols which are distinct from the first protocol; and multiplexing the coded video streams for transmission toward a user equipment (UE) via a wireless network, each of said multiplexed coded video streams being configured for UE decoding using a corresponding decoding protocol adapted to minimize long shadowing and long fading effects by using error detection and correction for reconstructing the multimedia content.

16. The method of claim 11, wherein the first protocol comprises a video decompression technique using MPEG2 or H.264.

17. A non-transitory computer-readable storage medium storing instructions which, when executed by a computer, cause the computer to perform a method for efficiently processing a multimedia content, the method comprising:

receiving the multiplexed version of the multimedia content having an original encoding rate associated therewith;

processing the multiplexed version of the multimedia content to form a demodulated and decoded stream of the multimedia content according to a first protocol;

demultiplexing the demodulated and decoded stream of multimedia content into a plurality of distinct coded video streams comprising respective descriptors and coefficients;

decoding each of the plurality of distinct coded video streams using a respective decoding protocol of a plurality of protocols which are distinct from the first protocol, said respective decoding protocol being adapted to minimize long shadowing and long fading effects using error detection and correction for reconstructing the multimedia content; and propagating the decoded streams toward a presentation device for communicating the multimedia content.

18. The non-transitory computer-readable storage medium of claim 17, wherein the first protocol comprises a video decompression technique using MPEG2 or H.264.

19. An apparatus for efficiently processing a multimedia content, the apparatus comprising:

a processor configured for:

receiving the multiplexed version of the multimedia content having an original encoding rate associated therewith;

processing the multiplexed version of the multimedia content to form a demodulated and decoded stream of the multimedia content according to a first protocol;

demultiplexing the demodulated and decoded stream of multimedia content into a plurality of distinct coded video streams comprising respective descriptors and coefficients;

decoding each of the plurality of distinct coded video streams using a respective decoding protocol of a plurality of protocols which are distinct from the first protocol, said respective decoding protocol being adapted to minimize long shadowing and long fading effects using error detection and correction for reconstructing the multimedia content; and propagating the decoded streams toward a presentation device for communicating the multimedia content.

20. The apparatus of claim 19, wherein the first protocol comprises a video decompression technique using MPEG2 or H.264.

* * * * *